(12) United States Patent
Winkler et al.

(10) Patent No.: US 12,644,756 B2
(45) Date of Patent: Jun. 2, 2026

(54) FOOTFALL DETECTION METHOD AND APPARATUS

(71) Applicant: Buchwalter Digital Ltd, Beit-Shemesh (IL)

(72) Inventors: Yair Winkler, Jerusalem (IL); Eduard Dubinin, Bat-Yam (IL)

(73) Assignee: What's On Digital Ltd, Tel Aviv (IL)

( * ) Notice: Subject to any disclaimer, the term of this patent is extended or adjusted under 35 U.S.C. 154(b) by 634 days.

(21) Appl. No.: 17/917,568

(22) PCT Filed: Apr. 7, 2021

(86) PCT No.: PCT/IL2021/050405
§ 371 (c)(1),
(2) Date: Oct. 7, 2022

(87) PCT Pub. No.: WO2021/205458
PCT Pub. Date: Oct. 14, 2021

(65) Prior Publication Data
US 2023/0168119 A1 Jun. 1, 2023

Related U.S. Application Data

(60) Provisional application No. 63/006,110, filed on Apr. 7, 2020.

(51) Int. Cl.
*G01G 19/414* (2006.01)
*G01G 19/44* (2006.01)
*G06V 20/52* (2022.01)
(52) U.S. Cl.
CPC ........... *G01G 19/414* (2013.01); *G01G 19/44* (2013.01); *G06V 20/52* (2022.01)

(58) Field of Classification Search
CPC ...... G01G 19/414; G01G 19/44; G06V 20/52; G06Q 30/0621; G08B 13/10
See application file for complete search history.

(56) References Cited

U.S. PATENT DOCUMENTS

2006/0171570 A1* 8/2006 Brendley ............... G08B 13/10
340/5.52
2013/0284806 A1* 10/2013 Margalit ............. G07G 1/0009
235/382

(Continued)

FOREIGN PATENT DOCUMENTS

WO WO-2017216313 A1 * 12/2017 ............. H04L 67/52
WO WO 2021/205458 10/2021

OTHER PUBLICATIONS

International Preliminary Report on Patentability Dated Sep. 29, 2022 From the International Preliminary Examining Authority Re. Application No. PCT/IL2021/050405. (14 pages).

(Continued)

*Primary Examiner* — Peter J Macchiarolo
*Assistant Examiner* — Mireille S Sadate-Moualeu

(57) ABSTRACT

Apparatus for detection and identification of footfall, comprises an arrangement of pressure detectors on a horizontal surface; a footfall pattern detector to receive a sequence of signals from each pressure detector in distinguishable manner over a time frame, to build from said signals a time evolution of a footfall event on said horizontal surface; and a tracker to compare different time evolutions, and thereby to connect together different footfall events to track a person or object over said horizontal surface.

19 Claims, 7 Drawing Sheets

(56) References Cited

U.S. PATENT DOCUMENTS

2014/0201041 A1    7/2014  Meyer
2019/0313978 A1    10/2019  Cole et al.

OTHER PUBLICATIONS

International Search Report and the Written Opinion Dated Jul. 25, 2021 From the International Searching Authority Re. Application No. PCT/IL2021/050405. (19 Pages).
Office Action and Search Report Dated Dec. 31, 2024 From the Israel Patent Office Re. Application No. 297173. (7 Pages).
Lu et al. "Biomechanics of Human Movement and Its Clinical Applications", The Kaohsiung Journal of Medical Sciences, 28(2 Suppl.): S13-S25, Available Online Jan. 9, 2012.

* cited by examiner

FOOTFALL DETECTION METHOD AND APPARATUS

RELATED APPLICATIONS

This application is a National Phase of PCT Patent Application No. PCT/IL2021/050405 having International filing date of Apr. 7, 2021, which claims the benefit of priority under 35 USC § 119 (e)_of U.S. Provisional Patent Application No. 63/006,110 filed on Apr. 7, 2020. The contents of the above applications are all incorporated by reference as if fully set forth herein in their entirety.

FIELD AND BACKGROUND OF THE INVENTION

The present invention, in some embodiments thereof, relates to a footfall detection method and apparatus and, more particularly, but not exclusively, to a device and method for locating and identifying footfall of people and of products.

Today, human and product recognition parameters are extracted from a camera input video by image analysis algorithms and deep learning, e.g. facial recognition, eye pupil recognition, finger, palm or product shape and design recognition.

Chinese patent application CN103955715A teaches detection of pressure on a floor at multiple points and has some stored profiles to which the detected pressure is compared. An algorithm outputs the nearest profile to the pressure detection found and thus can distinguish between a limited numbers of different footprints.

CN103778691A carries out image detection based on a pattern of pressure on floor detectors.

U.S. Pat. No. 7,726,206 also shows use of multiple pressure points on a floor, and is specifically for detection of a foot.

U.S. Pat. No. 9,077,343 shows multiple people being detected by a sensor arrangement embedded in a floor. The sensor may determine the distribution of people in a building and determine where to apply heating, lighting or air conditioning. The detection may be part of operating a smart building.

While the above documents are able to detect footfall, they are unable to distinguish in a general way between different individuals. The first application can distinguish between a limited number of individuals provided a footprint profile is prestored, but if an unknown individual appears, they will be linked with the prestored profile to which they are closest, and hence lead to a misidentification.

Regarding tracking of product storage on shelves, the Toshiba company of Japan has applications and patents which relate to smart shelf implementations based on RFID tags. Using the tags, the storekeeper is able to keep track of what products are present in the shop and where, and which shelves need restocking. The system depends on the products all being provided with RFID tags which can be expensive and time consuming.

U.S. Pat. No. 9,275,361 has smart shelf detection based on weight, and more particularly discloses a weight sensing system for retail shelves that includes multiple shelves having an electrical communication and power distribution system, and weight sensors located on the top surfaces of the shelves and coupled to the electrical communication and power distribution system for detecting the placement of retail products on the shelves. A controller monitors real-time at-the-shelf inventory and issues alerts when a retail product becomes out-of-stock, is anticipated to become out-of-stock, or is misplaced on a shelf. Collection of real-time inventory data enables comprehensive inventory control at the shelf and in storage areas.

SUMMARY OF THE INVENTION

The present embodiments provide a floor or shelf touch-screen, more particularly a grid layout with pressure sensitivity for the ground, for a floor or for a shelf, which detects pressure on the floor etc. with relatively high resolution, allowing for identification of the person or product. A method is provided which allows for the footfall of an individual to be distinguished from other individuals and thus to be tracked, since the evolution in time of the footfall of each individual is very distinctive. Products on shelves do not have such an evolution in time but they do have a pressure pattern and a weight, which allows them to be distinguished fairly well over other products. The methodology may thus distinguish to some extent between different products and keep track of what is on the supermarket shelves independently of any tagging system.

According to an aspect of some embodiments of the present invention there is provided apparatus for detection and identification of footfall, comprising:

an arrangement of pressure detectors on a horizontal surface;

a footfall pattern detector connected to receive a sequence of signals from each pressure detector in distinguishable manner over a time frame, the detector being configured to build from the signals a time evolution of a footfall event on the horizontal surface;

a tracker configured to compare different time evolutions, and thereby to connect together different footfall events to track a person or object moving over the horizontal surface.

In an embodiment, the footfall pattern detector is configured to build the time evolutions as three-dimensional graphs and the tracker is configured to compare the three-dimensional graphs using image processing.

In an embodiment, the time evolution comprises a first evolution of a volume center of mass and a second evolution of a shape center of mass, the apparatus being configured to extract a parameter relating the volume center of mass and the shape center of mass.

Embodiments may comprise a registration unit to register the person or object prior to tracking.

In an embodiment, the tracker is configured to track as a single object or person any sequence of footfalls having a same time evolution and not to track as a single or person any sequence of footfalls having different time evolutions.

In an embodiment, the footfall pattern detector is configured to use weight vectors obtained from the pressure detectors to obtain the three-dimensional graphs.

In an embodiment, the horizontal surface is a floor within a building and the apparatus is connected to a building management system to provide building services in accordance with the tracking.

In an embodiment, the horizontal surface is a floor within a building, the apparatus being connected to a safety or security system to provide information about a distribution of people within the building for safety or security needs.

In an embodiment, the horizontal surface is a floor within an elevator.

In an embodiment, the horizontal surface is a vehicle parking area, the apparatus providing an indication of availability and location of parking.

In an embodiment, the horizontal surface is a floor of a retail space, the apparatus providing an indication over time of the movements of customers over the retail space.

Embodiments may track individual customers and may include a notification unit to push notifications to the individual customers in accordance with parts of the retail space that they are entering or have entered.

According to a second aspect of the present invention there is provided apparatus for detection and identification of static objects from a weight pattern, comprising:

an arrangement of pressure detectors on a horizontal surface;

a weight pattern detector connected to receive signals from each pressure detector in distinguishable manner, the detector being configured to build from the signals a weight pattern of an object on the horizontal surface;

a shelf tracker configured to compare different weight patterns to expected weight patterns, and thereby to provide a view of objects over the horizontal surface.

In an embodiment, the weight pattern detector is configured to build three-dimensional graphs from the weight patterns, and the shelf tracker is configured to compare the three-dimensional graphs using image processing.

According to a third aspect of the present invention there is provide retail tracking apparatus comprising:

a first device for detection and identification of footfall, the first device comprising:

an arrangement of pressure detectors on a first horizontal surface, the first horizontal surface being a floor in a retail space;

a footfall pattern detector connected to receive a sequence of signals from each pressure detector in distinguishable manner over a time frame, the detector being configured to build from the signals a time evolution of a footfall event on the horizontal surface;

a tracker configured to compare different time evolutions, and thereby to connect together different footfall events to track a person moving over the first horizontal surface;

a second device for detection and identification of static objects from a weight pattern, the second device comprising:

an arrangement of pressure detectors on a second horizontal surface, the second horizontal surface being a product-holding surface;

a weight pattern detector connected to receive signals from each pressure detector in distinguishable manner, the detector being configured to build from the signals a weight pattern of an object on the second horizontal surface;

a shelf tracker configured to compare different weight patterns to expected weight patterns, and thereby to provide a view of objects over the horizontal surface, including timing of objects being removed from the second horizontal surface; and a retail tracker connected to the first device and the second device and configured to match tracked persons with corresponding removed objects.

In an embodiment, at least one member of the group consisting of the tracker, the footfall pattern detector, the weight pattern detector, and the retail tracker is cloud-implemented.

In embodiments, one or more cameras are positioned in relation to the horizontal surface, and any of the cameras may be triggered into operation by at least one predetermined feature of said footfall detection. The features may include: location of the footfall, direction of the footfall, location of a pause in the footfall, and identification of a tracked person.

In embodiments, the one or more cameras transfer image data to a cloud location. The triggering is used to limit a bandwidth of the transfer and/or the quantity of data that needs to be stored.

According to a fourth aspect of the present invention there is provided a method for detection and identification of footfall, comprising:

providing an arrangement of pressure detectors on a horizontal surface;

receiving a sequence of signals from each pressure detector in distinguishable manner over a time frame;

building from the signals a time evolution of a footfall event on the horizontal surface;

comparing different time evolutions; and connecting together different footfall events to track a person or object moving over the horizontal surface.

The method may comprise building the time evolutions as three-dimensional graphs and comparing the three-dimensional graphs using image processing.

The method may comprise registering the person or object prior to tracking.

The method may comprise tracking as a single object or person any sequence of footfalls having a same time evolution and not to track as a single or person any sequence of footfalls having different time evolutions.

The method may comprise using weight vectors obtained from the pressure detectors to obtain the three-dimensional graphs.

In an embodiment, the horizontal surface is a floor within a building, and the method provides building services in accordance with the tracking.

In an embodiment, the horizontal surface is a vehicle parking area, and the method provides an indication of availability and location of parking.

In an embodiment, the horizontal surface is a floor of a retail space, and the method provides an indication over time of the movements of customers over the retail space.

The method may track individual customers and provide notifications to the individual customers in accordance with parts of the retail space that they are entering or have entered.

According to a fifth aspect of the present invention there is provided a method for detection and identification of static objects from a weight pattern, comprising:

providing an arrangement of pressure detectors on a horizontal surface;

receiving signals from each pressure detector in distinguishable manner;

building from the signals a weight pattern of an object on the horizontal surface;

comparing different weight patterns to expected weight patterns;

using the comparison, providing an indication of distribution of objects over the horizontal surface.

The method may comprise building three-dimensional graphs from the weight patterns and comparing the three-dimensional graphs using image processing.

In an embodiment the detector may use weight vectors obtained from the pressure detectors to obtain the three-dimensional graphs.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
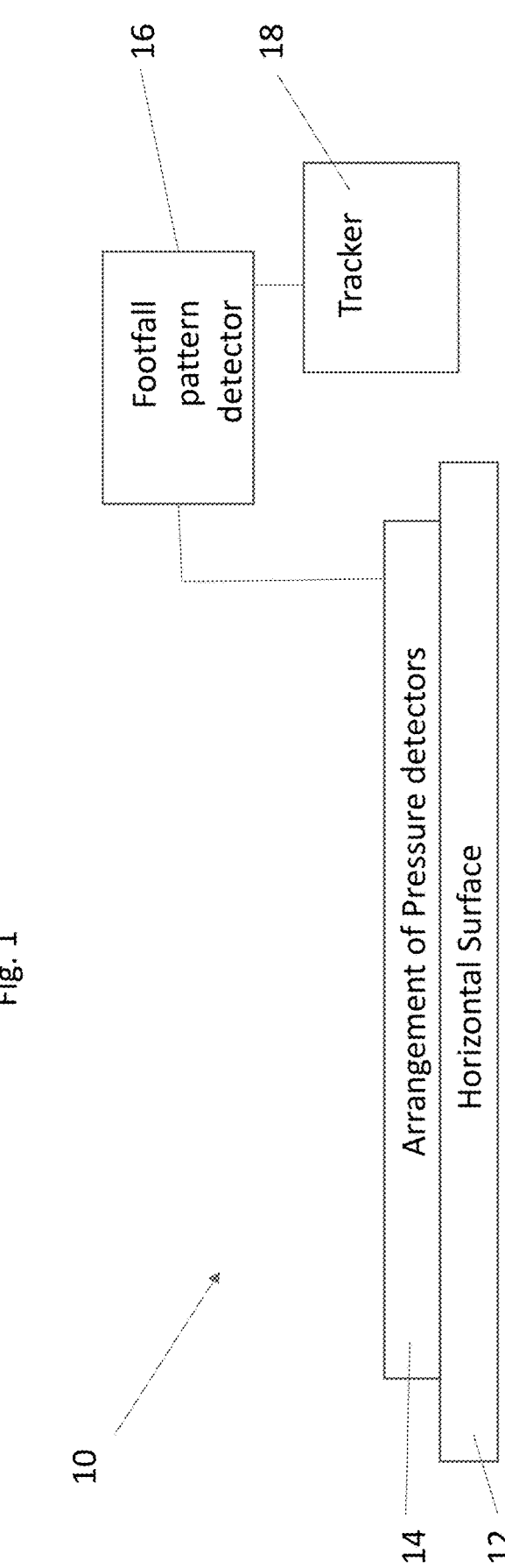
FIG. 1 is a simplified block diagram showing an embodiment of the present invention.

The present invention, in some embodiments thereof, relates to a footfall detection method and apparatus and, more particularly, but not exclusively, to such a system for tracking people or animals and for tracking products or other objects.

Apparatus for detection and identification of footfall according to the present embodiments may comprise an arrangement of pressure detectors on a horizontal surface; a footfall pattern detector to receive a sequence of signals from each pressure detector in distinguishable manner over a time frame, to build from said signals a time evolution of a footfall event on said horizontal surface; and a tracker to compare different time evolutions, and thereby to connect together different footfall events to track a person or object over said horizontal surface.

A cloud implementation may be used, and a variation may be built for use on product shelves to track stationary products. The embodiments may be combined so that the cloud or other processing combines data from tracking individuals with data from tracking the shelves to determine who is removing what products.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Referring now to the drawings, FIG. 1 illustrates apparatus 10 for detection and identification of footfall. The apparatus may be installed anywhere where there is a horizontal surface 12 on which people walk or run or object move or objects are placed, and the idea is to track the people or objects.

An arrangement of pressure detectors 14 is laid out on the horizontal surface 12. The pressure sensors may be embedded within the surface or formed as a layer on top, or concealed under a carpet.

The pressure sensors are connected to a footfall pattern detector 16. The pattern detector is connected to the pressure sensors in such a way as to receive a sequence of signals from any activated pressure detector in distinguishable manner over a time frame. The detector then builds a time evolution of a footfall event on the horizontal surface. That is to say, there is a sequence of weight shifts as a foot lands on a surface and the person attains a balanced position. The sequence is unique to individual people so that characterizing of the time evolution provides a way of determining which footfall events belong to the same person and which do not. Thus, individuals can be followed as they travel over the horizontal surface.

Tracker 18 thus compares the different time evolutions obtained by the pattern detector 16 and connects together the different footfall events that share the same time evolutions to track a person or object moving over the horizontal surface.

The pressure sensors may be arranged in any suitable manner that provides a resolution that is higher than the size of the footprints of the people, animals or objects whose footprints are being detected. For example the footprint for a human may be measured over anything between 6 and a hundred or more points. There is a balance between needing more data points to get an accurate identification and limiting the number of data points so as not to overwhelm the available computing power and the skilled person will look for the most suitable balance in any given case. A 5×5 mm resolution may be suitable for human footfall.

Figure 2:
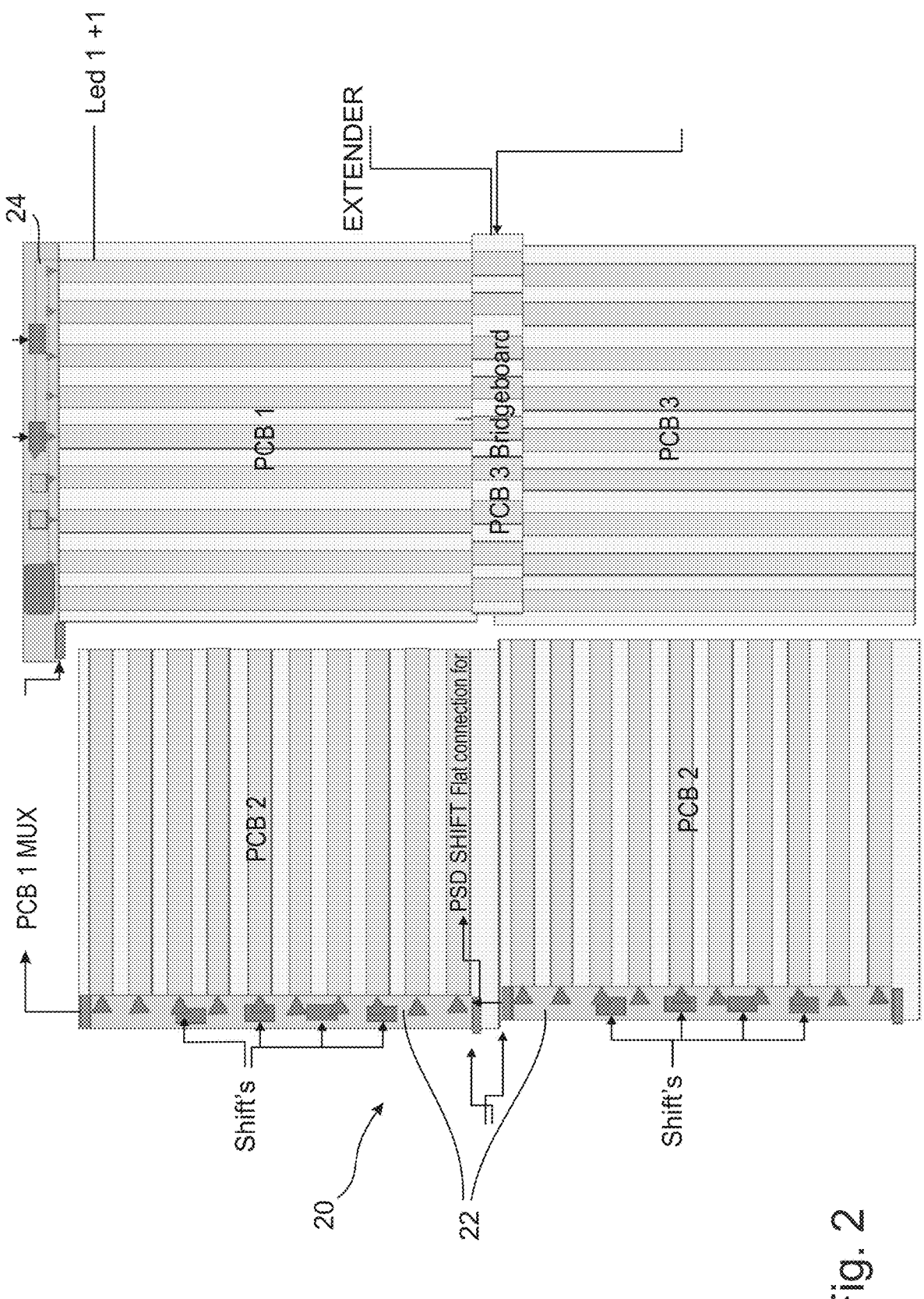
FIG. 2 is a simplified diagram showing a detector for embedding into a horizontal surface according to embodiments of the present invention.

Reference is now made to FIG. 2 which illustrates an exemplary embodiment of an arrangement 20 of pressure sensors. As shown in FIG. 2, two layers of PCB are placed one above the other. Thus in this example PCBs 1 and 3 may be placed over PCB2. One layer has horizontal conductors and the other layer has vertical conductors and the conductors are brought into contact when under pressure from above. One of the sets of conductors is energized over a cycle, via shift registers 22, and for any junction under pressure the signal is detected at the corresponding conductor in the other set at detector 24, giving the location of the junction. The conductors may be separated by a resistive material whose resistance varies with pressure, so that the size of the signal detected depends on the magnitude of the pressure. The pattern detected may be processed into a series of weight vectors for each data point.

The input allows for a surface that provides pressure values in a high resolution. By high resolution is meant any resolution which exceeds criteria for sampling the footfall. In the embodiment of FIG. 2, a surface is formed which measures the resistance R at points in the matrix. The hardware design enables the capture of a matrix m×n more than once per second to give a picture of motion of the pressure shape and values of the footfall event.

As discussed above the resistance varies with weight. If R>a threshold value set at the calibration stage then data is transmitted. R is the value of the Resistance as changed by weight. The value of R is broadcast to a server on the cloud for data analysis.

Figure 3B:
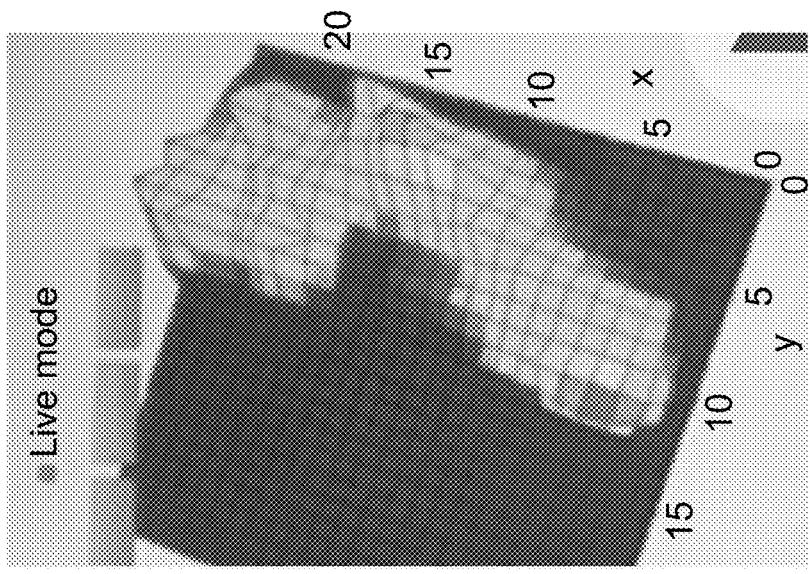
FIGS. 3A and 3B are two views at different times of a footfall event with a human right foot, obtained according to embodiments of the present invention.
Figure 3A:
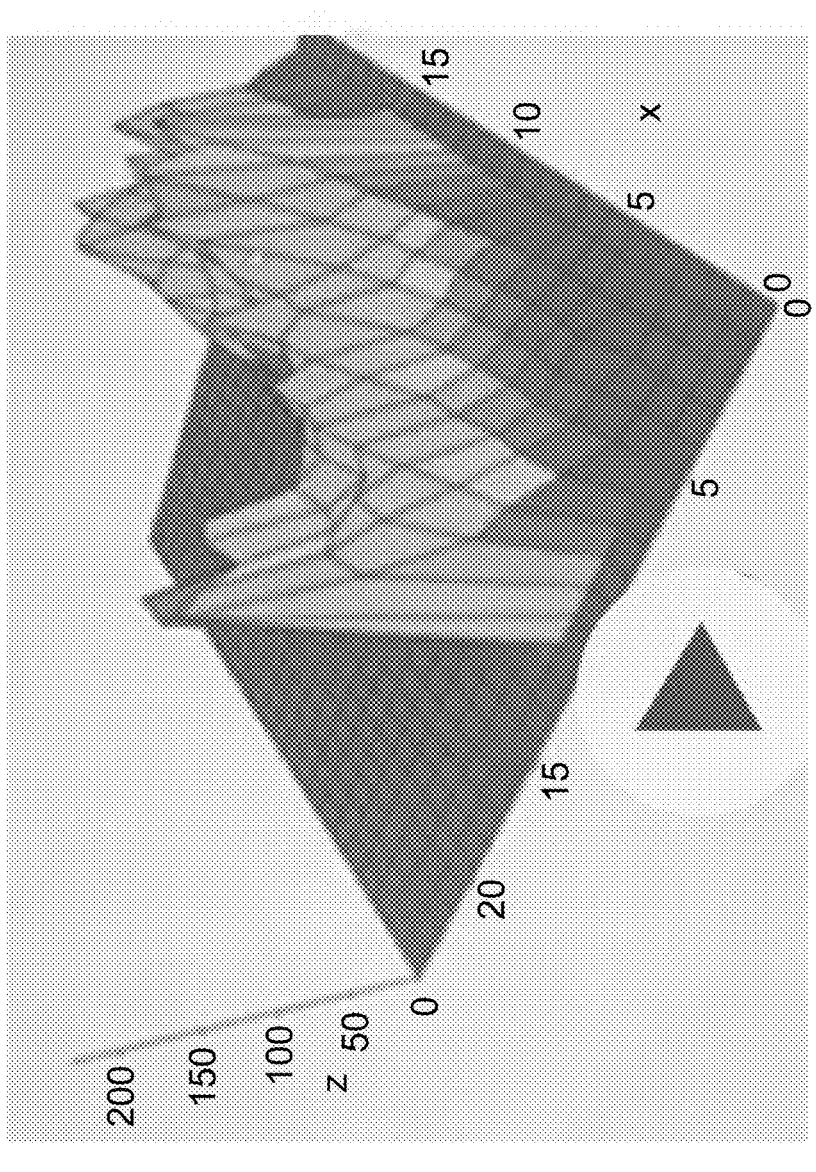

The surface matrix is scanned more than once per second, in order to capture the motion, specifically the 3D shape in motion as it is created from the presentation of the weights at each point at surface see FIGS. 3A and 3B.

In an embodiment, the surface comprises two layers of cooper stripes with a conductive sheet between them. By pressing at a point, the resistance R is changed to produce an analogue signal representative of weight, which is converted to a digital signal using a locally embedded chip.

The signal over all of the surface, has magnitudes, which represent the weight, a volume for the footprint shape and an x y location.

The process is carried out more than once per second and for greater accuracy, more than 10 times per second.

The signals are stored at shift register 24 which is embedded on one of the layers and finally the signal values per each XY are stored as a matrix per 1 frame at a Multiplexer. The Multiplexer sends the matrix sequence to the server via a WIFI signal to the cloud and then to the server.

The server analyses and stores the matrix data and may apply deep learning analysis to define the object profile characteristics to produce an identification.

The identification may be adjusted to provide a signature number of a person or a barcode number of an object and may then be compared with other Digital ID keys at the system.

The surface sensor 20 may include an embedded hardware chip including a mobile data transmitter, using e.g. WIFI protocol, to send data to the cloud and server. Analogue to digital conversion may be performed on the chip at the surface.

In summary, an embodiment may use a matrix containing horizontal and vertical copper lines with a conductive sheet in between. By pressing on a point the resistance R is changed. The changes in the resistance are used to form a vector with size and direction. A group of points can be measured and create a 3D shape over time.

A Center of mass of any given object can be measured and calculated over time and created a unique graph per any given object or object in motion, and the objects may be products for sale or a human or animal walking or running or moving in any other way.

Reference is now made to FIGS. 3A and 3B, which are three-dimensional graphs, seen from two different perspectives, showing the weights for the data points involved in successive stages of a footfall event. The way in which the three-dimensional graph develops over the course of the footfall event is unique to each individual. The footfall pattern detector 16 may convert the weight vectors received over the data points into such three-dimensional graphs. In each case, a sequence is built up of the development of the footfall event and the tracker 18 then compares different three-dimensional graph sequences, for example using image processing, to find out which footfall events belong to the same foot. Thus, the tracker may track as a single object or person any sequence of footfalls having the same or similar time evolution and not to track as a single or person any sequence of footfalls having different time evolutions.

Likewise, even if a person is standing, there is a unique pattern that allows different people to be distinguished. The unique pattern may again appear over a sequence of graphs since people do not usually stand absolutely still.

A human recognition from footfall algorithm according to the present embodiments comprises taking the footfall events and building both a walking and a standing profile out of the pressures measured over the area of the footprint as the person walks or stands.

The motion in the 3D graph is unique to each person and can be compared with previous footsteps to allow a sequence of steps to be linked to a single person.

A signature may be extracted from the 3D graph sequences involving features as follows:

Feature 1—Calculated Z shape over time t and saving of the sequence.

Feature 2—Calculated Center Of Mass in 2 dimensions, i.e. the surface shape X,Y coordinates and the Volume average.

Feature 3—Calculated Leg ratio, vector angle and intersection angle between two legs.

Machine intelligence, such as deep learning, may be used to build such a unique signature from one or more of the above features.

The signature build process contains an ongoing build profile identification process, and a comparison process of comparing the incoming data to existing signatures.

Figure 4:
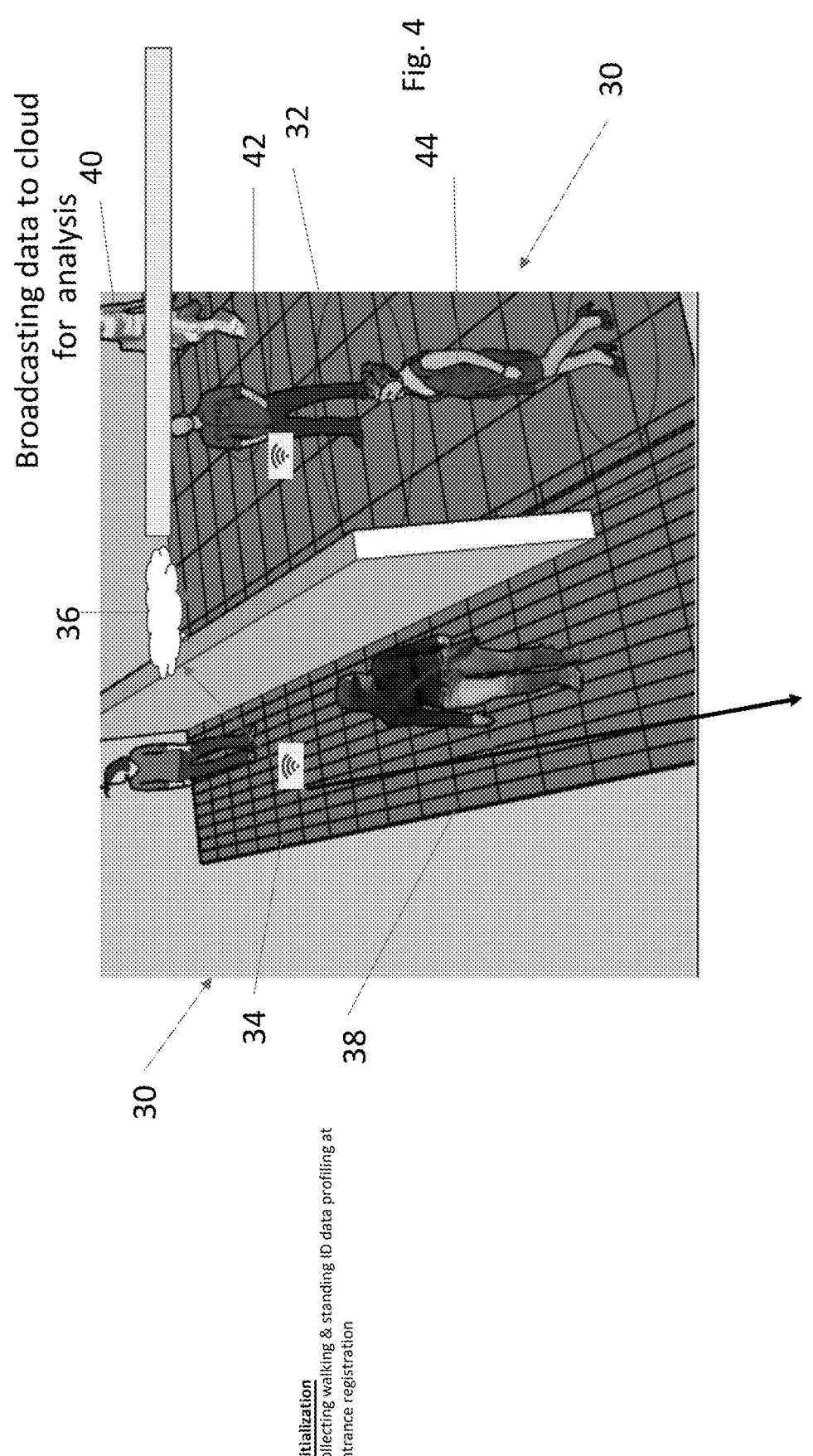
FIG. 4 is a simplified diagram of people being registered and then tracked using embodiments of the present invention.

Reference is now made to FIG. 4 which shows a building 30 having a floor 32 in which the detectors of the present embodiments are embedded in the floor. The PCB panels with the detectors transmit signals on a local basis, say over WiFi or Bluetooth™ or the like 34 and from there the signals are sent to the cloud 36 for further processing. In this way a building does not have to house computing capacity.

In this respect, the cloud, and cloud computing, refer to the use of a network of remote servers hosted on the Internet to store, manage, and process data, rather than a local server or a personal computer. Usually the remote servers belong to another entity and the use of the server is paid for in terms of computing time or memory capacity or a combination thereof.

In an embodiment, the entrance to premises may have a registration unit allowing people to register so that their footprint can be traced to them as an individual. For example a store might ask people to insert a store-card when entering or may identify them visually or by other means. In FIG. 4 registration information is collected from customer 38 as she enters the premises, including walking and standing identification via assessment of the three-dimensional graphs. The customers inside 40, 42 and 44 are tracked as they make their way across the floor. Their profiles may be constantly compared with incoming footfall events for matching purposes.

The floor may be within any sort of building, say an office building or a home, and the apparatus may be connected to a building management system that provides building services such as heating, air-conditioning and lighting, and the provision of these services may be modified in accordance with the tracking, so that lights are switched on as rooms are approached or air conditioning is switched off when rooms are empty etc. The tracking system may allow for automatic doors to be opened when approached and the tracking information can also be used for security or safety purposes. Thus, security or emergency personnel may be able to find out immediately who is in a building and where they are located. For example including a detector according to the present embodiments in the floor of an elevator may give immediate information on whether people are trapped if the elevator gets stuck.

In another embodiment, detectors of the present invention may be laid out in a parking area, and used to determine where there is available parking. The embodiments may provide communication to the driver to advise on where the available parking is and also alert if there is no such parking. Automatic driving systems may also be messaged to allow a car to find a remaining parking spot automatically.

In one embodiment, the horizontal surface to which the present embodiments are applied is the floor of a retail space. The apparatus may be used to provide an indication over time of the movements of customers over the retail space. Useful information may be obtained such as where the prime selling spots are, how much attention a dedicated display obtained etc. The retailer currently has information from sales made, but the present embodiments may be able to indicate that large numbers of people approached a particular selling spot but then went away again, meaning that a particular display was eye-catching but the offer itself disappointed. On the other hand the data may show that hardly anyone approached the display, although the number who did was close to the number of purchases, meaning that the display did not work although the offer was reasonable.

As well as providing overall data, individual customers may be given notifications that are relevant to the area of the store in which they are currently located or where they are heading or to encourage them to think again before leaving a particular area. The notifications may be push notifications on an application, or may be text messages or the like.

Figure 5:
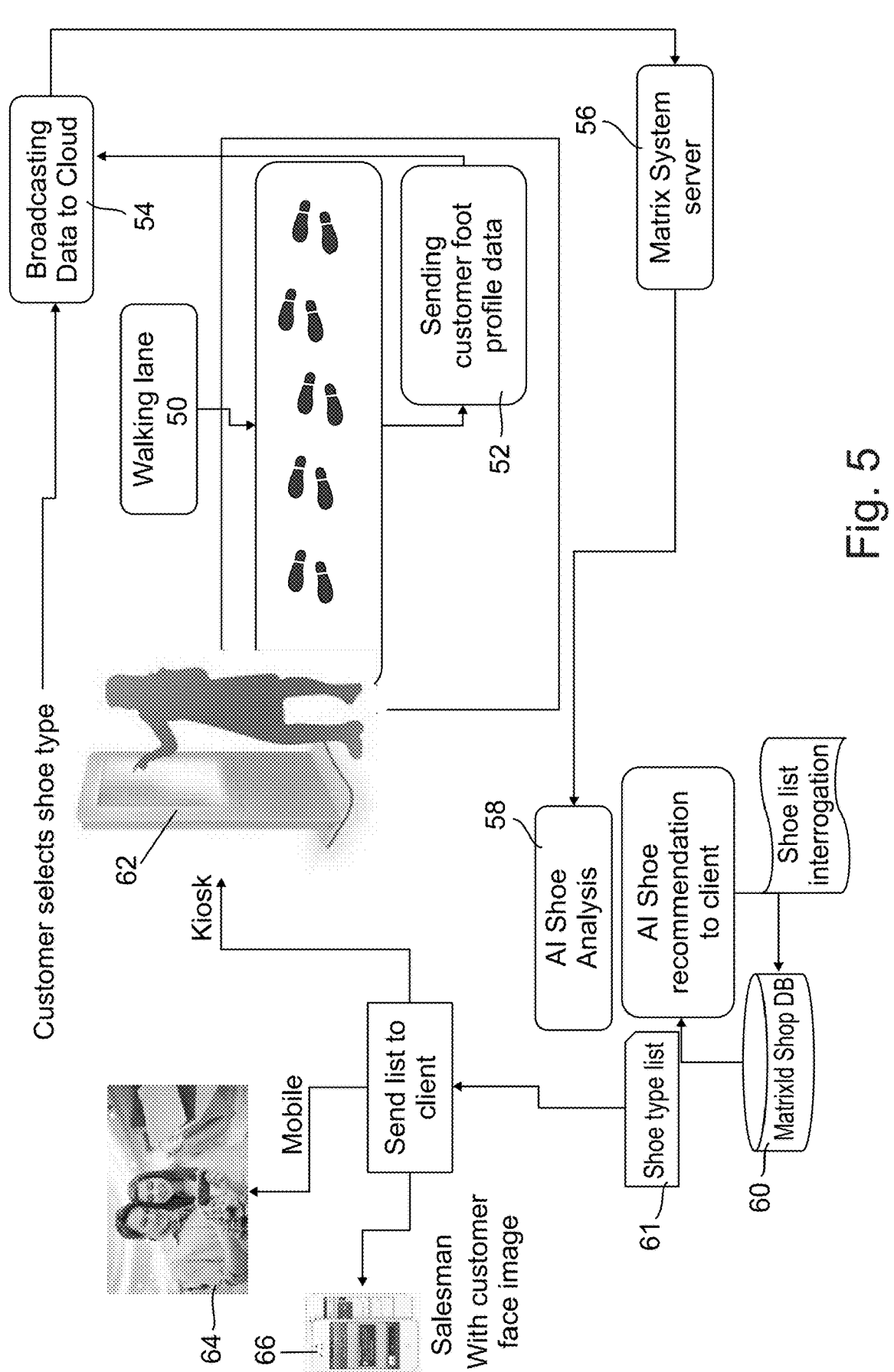
FIG. 5 is a simplified diagram of an embodiment of the present invention for automatically assessing a person's footfall and providing suitable shoes.

Reference is now made to FIG. 5, which illustrates an embodiment for use in selling shoes. A walking lane 50 is provided with a layer of detectors according to the present embodiments. The customer walks down the lane leaving a footfall profile as before, 52 which is sent to the cloud 54. A server 56 then analyzes the data for a shoe fit 58 and interrogates a show database 60 to make a shoe recommendation. A list of shoes 61 is then sent to the customer through an interface, either at a kiosk 62 or via a phone 64. A salesperson may then offer the shoes on the list. The salesperson may be sent the image of the customer to allow for identification.

Figures 6A, 6B:
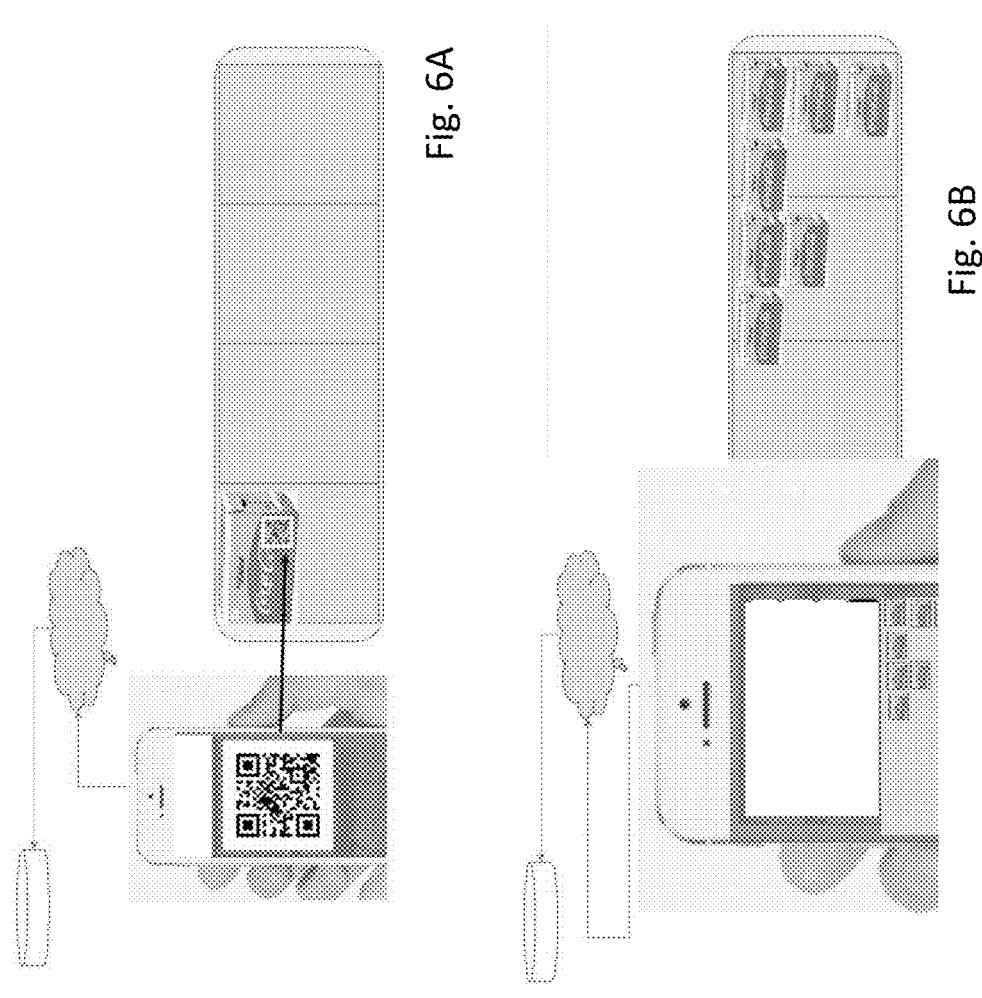
FIGS. 6A and 6B are simplified diagrams showing the filling of shelves using the present embodiments.

Reference is now made to FIG. 6A and FIG. 6B which are two views showing how the present embodiments may be used for loading products on a shelf. Initially the product shelf, or any other surface on which products are to be stored, is provided with a layer of detectors as discussed hereinabove. The density of the detectors may be higher than the footprint of the individual products and is preferably considerably higher, so as to be able to provide a reasonably detailed footprint profile that can distinguish different products The products are placed on the shelf in the usual way, with barcode scanning, and the detectors are able to detect that the product is now in position. The data from the detectors may be combined with the data from the scanner so that the exact products and locations are known. Then subsequently when the load is lightened at the specific location the system knows what product has been removed.

As well as combining barcode scanning information with shelf weight distribution, the system may combine shelf weight information with tracking information of customers so that the individual customer who has removed product X may be identified. This may later be combined with the information about what products were paid for. The combination of tracking information of the customers and weight information of removal of the products from the shelves may be carried out using a retail tracker. The retail tracker may be cloud based.

Thus apparatus for detection and identification of static objects from a weight pattern, may involve an arrangement of pressure detectors on a horizontal surface such as a product shelf in a retail space. A weight pattern detector may be connected to receive signals from each pressure detector in distinguishable manner, meaning that the signals from the different detectors are separately received and can be processed as individual signals. The detector may build from the signals a weight pattern of an object on the horizontal surface and a shelf tracker may compare different weight patterns to expected weight patterns, to provide a view of objects on the shelf. As mentioned the weight information may be combined with product scanning information.

As with the tracking of people, the weight pattern detector for the shelf may produce three-dimensional graphs, and the shelf tracker may compare the three-dimensional graphs using image processing.

The present embodiments may thus provide a human and product recognition identification algorithm method extracting from data values from pressure on a sensitive digital surface.

The present embodiments may provide a data from a digitized horizontal surface that measures the value of pressure of each point at the surface over time at a predetermined resolution and translates values at a pressure point into a vector. The vector is a location and weight vector, and a number of points aggregated together may describe a weight distribution of an object and provide a 3D graph that represents a field of vectors.

The graph allows the Center of Mass, (COM), to be calculated. The graph provides the motion characteristic of the object and is unique for each person, or similar for products.

There are two COM graphs that may be used, a shape against time graph (FIG. 3B) and a volume against time graph (FIG. 3A), and the relationship between the two centers of mass is a unique feature that can identify an individual. Such a relationship may be extracted from the graphs.

The graphs may be processed using deep learning or other artificial intelligence algorithms, and the system may compare differences and similarities between products and humans.

Figure 7:
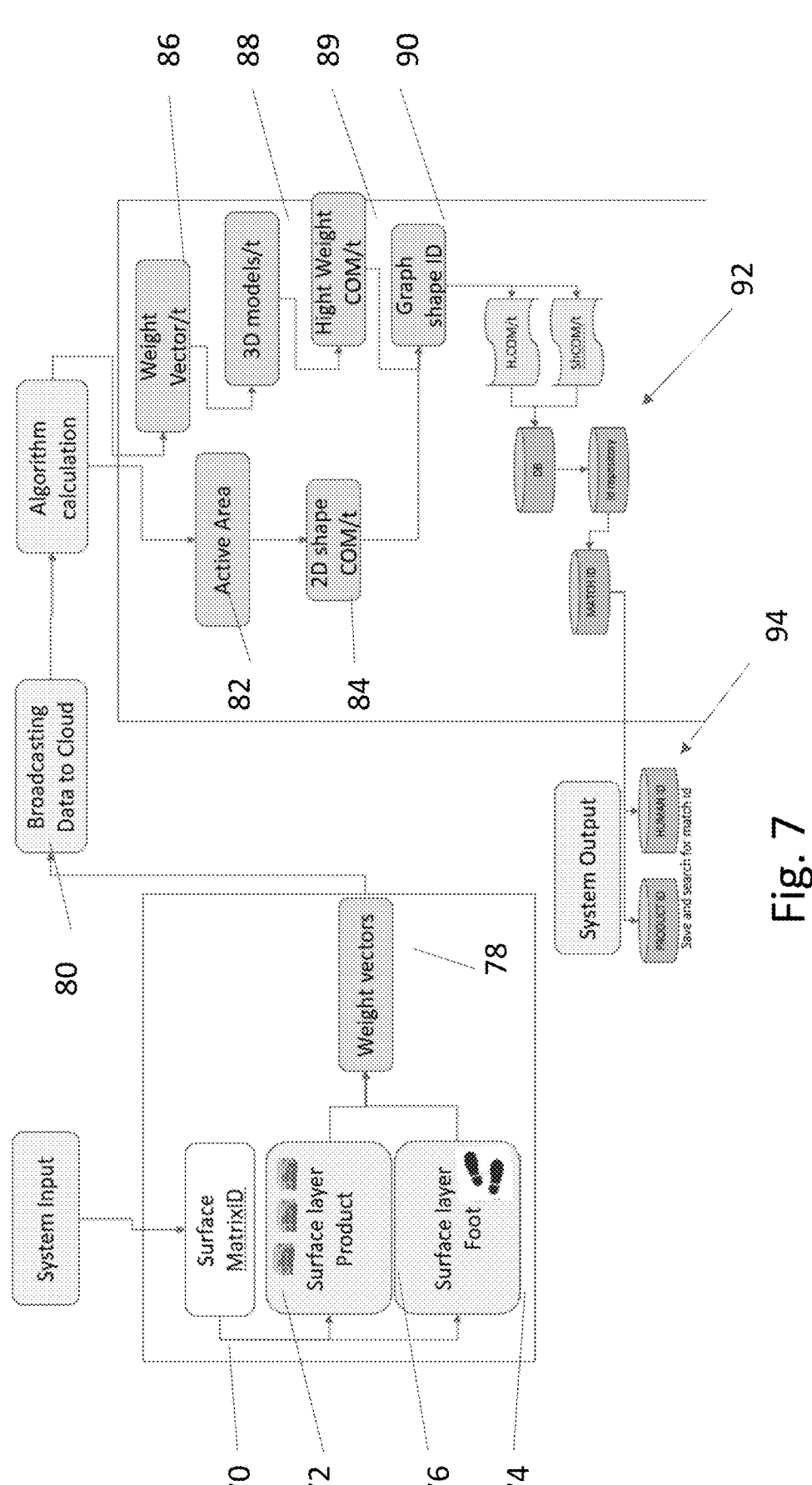
FIG. 7 is a block diagram showing a cloud implementation of the present embodiments.

Reference is now made to FIG. 7, which is a block diagram showing system components. A system input 70 includes a surface detection matrix 72 which is embedded into the floor or shelf etc. The detection matrix may be optimized for feet 74 or for products 76, the optimization relating to the different weights, the detection resolution and the dynamics, thus for products a low rate of scanning is acceptable, whereas for humans, where the footfall dynamics are captured, a much higher rate of scanning may be used.

The system input produces a series of weight distribution vectors 78 which are then processed. As shown here the processing is in the cloud and the data is broadcast 80 to the cloud but it may be carried out using local computing.

In the calculation part, an active area is determined from those data points which are currently producing active signals in a contiguous area. The active area is a 2D shape 82, has a center of mass COM and varies with time 84.

At the same time, the weight data itself may be processed in a time sequence 86 to produce a 3D graph that varies with time 88, again to provide height, weight and center of mass information 89. The 2D and 3D data are combined to provide a graph shape identification to be made 90. The identification is then compared with profiles in the databases 92 and a system output with a human or product identification is provided 94.

Embodiments may be used for human identification and tracking by footfall recognition, which may be carried out at private or public places, including closed places such as secured or prison instead of the conservative attendance counting. Identification may be with or without actually knowing who the person is.

Embodiments may be used in an elevator to tell the emergency people who is present. Embodiments may be used to allow the number of people at a particular location to be obtained, and the embodiments may identify persons lying on the floor, say for use by emergency services. Embodiments may be used in the retail environment to show who the customers are, where they are and how many of them there are. As mentioned, the number of stops near shelves may be matched with goods being removed from the shelved, and then matched again at the payment stage.

A digital floor and shelves may be linked to security cameras in a store, for example to trace sequence history and indicate which parts of the video recording need to be studied. In an example, by clicking on a product for example a four second sequence from the cameras that are at the site view of the current product shelf location, may be obtained. As a result, a quick list may be obtained of all events where an interaction with a product has happened within time frame of interest, based on footfall events in the area.

For product identification embodiments may reveal free space area at the shelf as well as location of the products themselves. The number products on the shelf and their locations may be compared to the planogram plans for the store.

The embodiments may provide a system for inventory management.

In an embodiment, detected footfall may be used to trigger camera operation. Such an embodiment may be applied to any of the situations discussed herein. For example cameras may be triggered when footfall indicates proximity. Unlike current art proximity detectors however, which merely detect proximity to a given point, the use of footfall detection may allow the direction of motion, or the identity of the person to be part of the triggering mechanism. Thus a person passing by a particular supermarket shelf may not trigger a camera, but a person pausing by a particular shelf location may trigger the camera. The camera that is triggered may be a security camera, or alternatively may be a stock monitoring camera, where the point of interest is the stock on the supermarket shelf, so that the shop may be notified when it is necessary to restock the shelf. The camera may be used to identify the product itself as it is removed by the customer, or may be used to identify the x-y location on the shelf from which the product was taken, the product then being identified by the x-y location and the planogram.

Yet again the camera may be a customer monitoring camera, that notes what product the customer has taken, say for faster processing at the checkout or for other purposes.

The camera images may be sent for processing in the cloud, and thus restricting image taking to triggers based on footfall may considerably reduce the required bandwidth and data storage requirements.

In the present text, the terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise.

It is appreciated that certain features of the invention, which are, for clarity, described in the context of separate embodiments, may also be provided in combination in a single embodiment, and the text is to be construed as if such a single embodiment is explicitly written out in detail. Conversely, various features of the invention, which are, for brevity, described in the context of a single embodiment, may also be provided separately or in any suitable subcombination or as suitable in any other described embodiment of the invention, and the text is to be construed as if such separate embodiments or subcombinations are explicitly set forth herein in detail.

Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. Apparatus for detection and identification of footfall, comprising:

an arrangement of pressure detectors on a horizontal surface;

a footfall pattern detector connected to receive a sequence of signals from each pressure detector in distinguishable manner over a time frame, the detector being configured to build from said signals a time evolution of a footfall event on said horizontal surface;

a time evolution tracker unit configured with registers to compare different time evolutions, and thereby to connect together different footfall events to track a person or object moving over said horizontal surface, wherein said time evolution tracker unit is configured to use said registers respectively to track a first evolution of a volume center of mass and a second evolution of a shape center of mass; and a comparator configured to extract a parameter relating said volume center of mass and said shape center of mass.

2. The apparatus of claim 1, wherein said footfall pattern detector is configured to build said time evolutions as three-dimensional graphs and said tracker is configured to compare said three-dimensional graphs using image processing.

3. The apparatus of claim 2, wherein said footfall pattern detector is configured to use weight vectors obtained from said pressure detectors to obtain said three-dimensional graphs.

4. The apparatus of claim 1, further comprising a registration unit to register said person or object prior to tracking.

5. The apparatus of claim 1, wherein said tracker is configured to track as a single object or person any sequence of footfalls having a same time evolution and not to track as a single object or person any sequence of footfalls having different time evolutions.

6. The apparatus of claim 1, wherein said horizontal surface is a floor within a building and said apparatus is connected to a building management system to provide building services in accordance with said tracking.

7. The apparatus of claim 1, wherein said horizontal surface is a floor within a building, the apparatus being connected to a safety or security system to provide information about a distribution of people within said building for safety or security needs, or wherein the horizontal surface is a floor within an elevator.

8. The apparatus of claim 1, wherein the horizontal surface is a vehicle parking area, the apparatus providing an indication of availability and location of parking.

9. The apparatus of claim 1, wherein said horizontal surface is a floor of a retail space, the apparatus providing an indication over time of the movements of customers over said retail space.

10. The apparatus of claim 9, configured to track individual customers and further comprising a microcontroller, the microcontroller serving as a notification unit to push notifications to said individual customers in accordance with parts of said retail space that they are entering or have entered.

11. Method for detection and identification of footfall, comprising:

providing an arrangement of pressure detectors on a horizontal surface;

receiving a sequence of signals from each pressure detector in distinguishable manner over a time frame;

building from said signals a time evolution of a footfall event on said horizontal surface;

comparing different time evolutions, wherein each said time evolution comprises a first evolution of a volume center of mass of said footfall event and a second evolution of a shape center of mass of said footfall event;

extracting a parameter relating said volume center of mass and said shape center of mass of said respective footfall event; and connecting together different footfall events to track a person or object moving over said horizontal surface.

12. The method of claim 11, comprising building said time evolutions as three-dimensional graphs and comparing said three-dimensional graphs using image processing.

13. The method of claim 11, further comprising registering said person or object prior to tracking.

14. The method of claim 11, comprising tracking as a single object or person any sequence of footfalls having a same time evolution and not to track as a single object or person any sequence of footfalls having different time evolutions.

15. The method of claim 11, comprising using weight vectors obtained from said pressure detectors to obtain said three-dimensional graphs.

16. The method of claim 11, wherein said horizontal surface is a floor within a building, the method comprising providing building services in accordance with said tracking.

17. The method of claim 11, wherein the horizontal surface is a vehicle parking area, the method further comprising providing an indication of availability and location of parking.

18. The method of claim 11, wherein said horizontal surface is a floor of a retail space, the method comprising providing an indication over time of the movements of customers over said retail space.

19. The method of claim 18, comprising tracking individual customers and providing notifications to said individual customers in accordance with parts of said retail space that they are entering or have entered.

* * * * *